US010459975B1

(12) United States Patent
Malpani

(10) Patent No.: US 10,459,975 B1
(45) Date of Patent: Oct. 29, 2019

(54) METHOD AND SYSTEM FOR CREATING AN AUTOMATIC VIDEO SUMMARY

(71) Applicant: SHUTTERSTOCK, INC., New York, NY (US)

(72) Inventor: Vaibhav Malpani, Jersey City, NJ (US)

(73) Assignee: SHUTTERSTOCK, INC., New York, NY (US)

( * ) Notice: Subject to any disclaimer, the term of this patent is extended or adjusted under 35 U.S.C. 154(b) by 273 days.

(21) Appl. No.: 15/385,737

(22) Filed: Dec. 20, 2016

(51) Int. Cl.
*G06F 16/00* (2019.01)
*G06F 16/738* (2019.01)
*G06F 3/0484* (2013.01)
*G06F 3/0485* (2013.01)
*G06F 16/71* (2019.01)
*G06F 16/735* (2019.01)
*G06F 16/9535* (2019.01)

(52) U.S. Cl.
CPC .......... *G06F 16/739* (2019.01); *G06F 3/0485* (2013.01); *G06F 3/04842* (2013.01); *G06F 16/71* (2019.01); *G06F 16/735* (2019.01); *G06F 16/9535* (2019.01)

(58) Field of Classification Search
CPC .................................................. G06F 16/739
USPC ........................................................ 707/706
See application file for complete search history.

(56) References Cited

U.S. PATENT DOCUMENTS 5,999,173 A * 12/1999 Ubillos ................ G11B 27/034
348/E5.056
9,787,902 B1 * 10/2017 Beysserie .......... H04N 5/23258
2017/0124400 A1 * 5/2017 Yehezkel Rohekar .....................
G06K 9/00335

* cited by examiner

*Primary Examiner* — Chelcie L Daye
(74) *Attorney, Agent, or Firm* — McDermott Will & Emery LLP

(57) ABSTRACT

A method is provided for receiving a selection of a key frame in a video and including the key frame within a first plurality of frames from the video. The method includes adjusting at least one weighting factor for a value entry in the first plurality of frames to obtain a second plurality of frames having at least one reduced dimensionality and obtaining a one-dimensional representation of the first plurality of frames with a plurality of weighted entry values from the second plurality of frames. Further, the method includes correlating two entry values in the one-dimensional representation to obtain a selector, storing the at least one weighting factor as a network entry in a process network when the selector picks the key frame from the first plurality of frames, and applying the process network to a third plurality of frames in the video to form a summary of the video.

20 Claims, 10 Drawing Sheets

METHOD AND SYSTEM FOR CREATING AN AUTOMATIC VIDEO SUMMARY

BACKGROUND

Field

The present disclosure generally relates to a computer-based video search engine, and more particularly to methods and systems to provide a video summary of relevant information in a video clip for the video search engine.

Description of the Related Art

Network accessible data file repositories for content commonly hosted on server devices ordinarily provide users of client devices with the ability to access search algorithms for searching and accessing data files for content in the data file repositories. For example, for a network accessible media content repository with a large volume of data files, such as for images and videos, a user that seeks to search for media related to cats may enter the search query "cats" into a search interface for the online image content repository accessible by and displayed on the user's client device. Media associated with the keyword "cat" or "cats" that is determined by the server to be responsive to the search query may then be returned to the client device for display to the user. There are, however, inefficiencies in the process of selecting a video clip when the search query returns a large amount of lengthy video clips. The user has no option but to replay large portions of each of the video clips in the result batch to determine whether the video clip is appropriate for further consideration. For long video clips, relevant information may be missed in a quick browse by the user. To reduce browsing and selection time for the user, some applications perform different strategies of frame deletion for video compression. However, these approaches may result in the loss of relevant or sensitive information that the user may in fact be interested in watching.

SUMMARY

According to one embodiment of the present disclosure, a computer-implemented method is provided. The method includes receiving an input selection of a key frame in a video clip and including the key frame within a first plurality of frames selected from the video clip. In some embodiments, the method includes adjusting at least one weighting factor for a value entry in the first plurality of frames to obtain a second plurality of frames having at least one reduced dimensionality and obtaining a one-dimensional representation of the first plurality of frames with a plurality of weighted entry values from the second plurality of frames. Further, in some embodiments the method includes correlating at least two entry values in the one-dimensional representation to obtain a selector, storing the at least one weighting factor as a network entry in a process network when the selector picks the key frame from the first plurality of frames, and applying the process network to a third plurality of frames in the video clip to form a video summary of the video clip.

According to one embodiment, a system includes one or more processors and a computer-readable storage medium coupled to the one or more processors. The computer-readable storage medium includes instructions that, when executed by the one or more processors, cause the one or more processors to receive a video clip from a user and request a user selection of a key frame in the video clip. In some embodiments, the instructions further cause the processor to receive, from the user, the key frame in the video clip, and select a plurality of frames from the video clip based on the key frame selected by the user. Further, the instructions may cause the processor to form a video summary of the video clip based on the plurality of frames, and configure the video summary of the video clip to play when the video clip is selected by a search engine and a pointer device hovers over a thumbnail of the video clip.

According to another embodiment, a non-transitory, machine-readable storage medium is described that includes machine-readable instructions for causing a processor to execute a method. In some embodiments, the method includes adjusting at least one weighting factor for a value entry in the first plurality of frames to obtain a second plurality of frames having at least one reduced dimensionality and obtaining a one-dimensional representation of the first plurality of frames with a plurality of weighted entry values from the second plurality of frames. Further, in some embodiments the method includes correlating at least two entry values in the one-dimensional representation to obtain a selector, storing the at least one weighting factor as a network entry in a process network when the selector picks the key frame from the first plurality of frames, and applying the process network to a third plurality of frames in the video clip to form a video summary of the video clip.

Further, in some embodiments, a system is described that includes a means for storing computer code. The system also includes a means for executing the computer code and cause the system to perform operations. The means for executing the computer code is configured to adjust at least one weighting factor for a value entry in the first plurality of frames to obtain a second plurality of frames having at least one reduced dimensionality and obtaining a one-dimensional representation of the first plurality of frames with a plurality of weighted entry values from the second plurality of frames. In some embodiments, the means for executing the computer code is further configured to correlate at least two entry values in the one-dimensional representation to obtain a selector, to store the at least one weighting factor as a network entry in a process network when the selector picks the key frame from the first plurality of frames, and to apply the process network to a third plurality of frames in the video clip to form a video summary of the video clip According to one embodiment of the present disclosure, a computer-implemented method is provided for uploading, by a user via an application on a client device, a video clip onto a server and receiving, by the user in the client device, a request from the server to select a key frame in the video clip. The method may further include providing, to a server, the key frame in the video clip based on a relevant feature to be emphasized in a video summary of the video clip wherein providing to the server the key frame in the video clip comprises selecting the key frame from the video clip with a scrolling tool provided in a user interface displayed on the client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
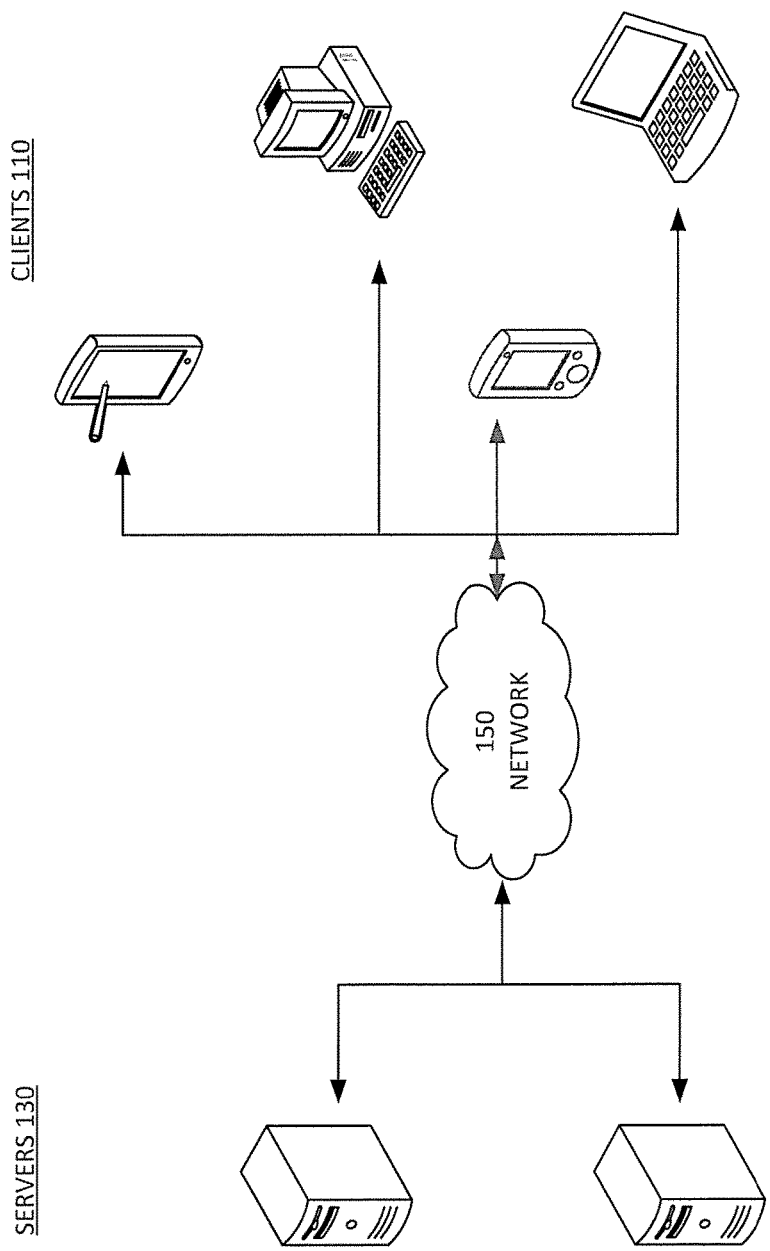
FIG. 1 illustrates an example architecture for creating and accessing an automatic video summary in a search engine suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be, for example, in reference to a digital document that is composed of one or more media elements of different types (text, image, video, audio, etc.). A content item can be a single picture or a single video clip. The term "image identifier" as used herein may refer to a form of metadata such as a tag and/or a label associated with an image for identifying the image or video clip.

General Overview

Search engines associated with video clip databases render video clips having large amounts of information that are difficult to parse through unless the user watches the entire video clip, or a substantial portion of it. This causes loss of time, for the user, for the computer, and for the network, while some relevant information may be missed by the user.

The disclosed system addresses this problem specifically arising in the realm of computer technology and network management by providing a solution also rooted in computer technology, namely, by considering automatic video summaries of video clips stored in a video database. The video summaries are generated using a three-dimensional video processing technique to capture and assign relevance scores to time-based features such as scenes including motion and modulation of patterns and objects in the video clips.

The subject system provides several advantages including providing accurate selection of relevant frames and scenes in a video clip. Also, the system reduces the time spent by a user to decide whether a video clip should be selected or discarded. The system provides a machine learning capability where the system can learn from a content item and from prior user experience so as to increase accuracy and network efficiency with better targeted video summaries.

Some embodiments disclosed herein provide a system and a method to select video frames from a video clip that contain relevant features for the user. In some embodiments, a tool includes a convolutional neural network (CNN) to summarize video clips when a user uploads video clips to a server. The server is configured to play the video summaries when a second user hovers a pointing device over a thumbnail of the video clip. CNNs as disclosed herein generate a hierarchy of representations with an increased level of abstraction of a video frame including a two-dimensional array of pixels (e.g., pixel-edge-texton-motif part-object). It is found that although the network might be trained for a particular task, features learned in the CNN may be used in a broader range of tasks. In some embodiments, a single classifier may be used to control multiple, different tasks.

The proposed solution further provides improvements to the functioning of the computer itself because it saves data storage space and reduces network usage. Specifically, the computer hosting the collection of video clips and video summaries to be searched has an improved performance when executing methods as disclosed herein. Moreover, the proposed solution reduces the time usage of a client device when a user desires to expediently find the relevant information in a video clip before making a relevant decision. The relevant decision may be to download, to delete, or to discard the video clip. For example, in some embodiments the video clip may be a long footage from a video surveillance device or a sporting event and the user may be only interested on a discrete event that occurred at a specific, unknown time. In such configuration, a method and system as disclosed herein would save the usage time of the client computer device to scroll the video frames to find the relevant information, including the time of occurrence of the discrete event (e.g., a "robbery," a "goal," a "home run," and the like).

Although many examples provided herein describe a user's search inputs being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture for creating and accessing an automatic video summary in a search engine suitable for practicing some implementations of the disclosure. Architecture 100 includes servers 130 and clients 110 connected over a network 150.

One of servers 130 is configured to host a computer-operated neural network. The neural network, which can be a convolutional neural network, is trained to identify features of images corresponding to one or more image identifiers. One of the many servers 130 also hosts a collection of images, video clips, and multimedia files. For purposes of load balancing, multiple servers 130 can host the neural network and multiple servers 130 can host the collection of images.

Servers 130 can be any device having an appropriate processor, memory, and communications capability for hosting the neural network, the collection of images, and the image search engine. The image search engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Automatic Video Summary System

Figure 2:
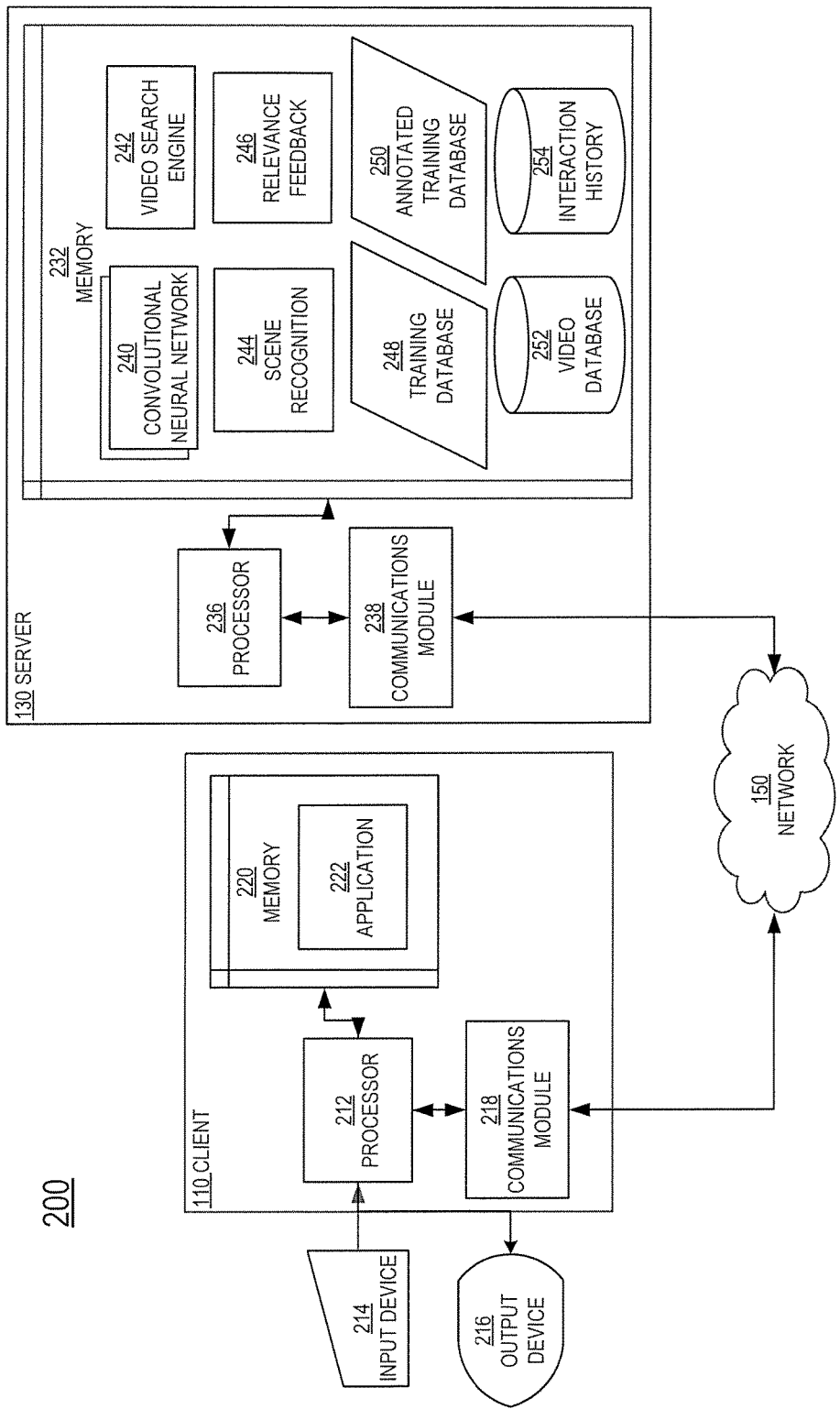
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are connected over network 150 via respective communications modules 218 and 238.

Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. In some embodiments, memory 232 includes a CNN 240. Further, in some embodiments CNN 240 includes a three-dimensional (3D) CNN to provide an automatic video summary of a video clip stored in a video database 252. As discussed herein, CNN 240 is a feed-forward artificial neural network where individual neurons are tiled in such that individual neurons (or 'nodes') respond to overlapping regions in a visual field. The architecture of CNN 240 may be in the style of existing well-known image classification architectures such as AlexNet, GoogLeNet, or Visual Geometry Group models (e.g., VGG networks). In certain aspects, CNN 240 includes a stack of layers followed by at least one fully connected layer. CNN 240 can include a loss layer (e.g., softmax, L2 loss, or sigmoid cross-entropy loss layer) to back propagate errors so that CNN 240 learns and adjusts its weights to better fit a desired outcome including provided image data (e.g., the selection of a specific frame in a sequence of frames, or an object, or a specific scene in a video clip). Moreover, a 3D CNN as disclosed herein includes at least one layer that performs computations such as data convolution and sub-sampling on multiple frames corresponding to different capture times on a video clip. Accordingly, in embodiments as disclosed herein, CNN 240 provides results on time-based features of a video clip, such as a 'fast' motion scene, a 'slow' motion scene, or a scene related to certain user-selected aspects of the video clip (e.g., a 'cutting the cake' scene at a wedding video clip, a 'my favorite team score' in a soccer video clip, and the like).

Memory 232 also includes a video database 252 and a video search engine 242 for searching video database 252. In one or more implementations, video database 252 represents a database that contains a plurality of video clips and, for each video clip, a mapping from a video identifier to a data file containing a video summary of the video clip. Also included in memory 232 of the server 130 is a training database 248. Training database 248 can be, for example, a dataset of content items (e.g., video clips) corresponding to any one of abstract scenes, sport scenes, outdoor scenes, slow motion scenes, fast motion scenes, scenes containing logo images, scenes containing icon images, scenes containing isolated images, scenes containing texture images, scenes containing Instagram images, scenes containing illustration images, scenes containing background images, scenes containing stock people images, scenes containing high dynamic range (HDR) images, scenes containing collection images, scenes containing macro images, scenes containing candid people images, scenes containing vector images, scenes containing pattern images, and the like.

Training database 248 may include multiple instances (or sets) of training data, where each instance (or set) of training data is associated with a particular style class. In some embodiments, training database 248 includes a label indicating the style class strength (e.g., very candid, somewhat candid, not candid, very fast, very slow, and the like) as well as the video clips. Training database 248 also may include video vector information and video cluster information, in which the video vector information identifies training vectors representing a large sample of training video clips and video summaries and the video cluster information identifies clusters representing respective semantic concepts. In this respect, the vectors corresponding to a semantic concept (e.g., 'beach') are clustered into one cluster representing that semantic concept. Moreover, the video cluster may include scenes selected from fragments of at least one video clip or a video summary stored in video database 252. Accordingly, in some embodiments the video cluster may include a 3D volumetric set of entry values corresponding to multiple 2D video frames forming a scene sequence along a timeline-dimension. In one or more implementations, training database 248 may be populated with public domain video clips from third-party video sharing websites.

Training vectors for each of the video clips are clustered into a predetermined number of clusters according to a clustering algorithm, for example, using k-means clustering. For example, the training vectors for video clips in video database 252 can be assigned to clusters by the clustering algorithm based on a similarity threshold. The number of clusters can be manually selected, such as, for example, designating that video database 252 be divided into 1000 clusters. Training vectors for video clips in video database 252 are associated with one of the clusters based on a similarity threshold using the clustering algorithm. The similarity threshold can indicate visual similarity, conceptual similarity, keyword similarity, or another measurement of similarity between the video clips. Other clustering algorithms can also be used, including other methods of vector quantization, or other clustering approaches such as affinity propagation clustering, agglomerative clustering, Birch clustering, density-based spatial clustering of applications with noise (DBSCAN), feature agglomeration, mini-batch k-means clustering, mean shift clustering using a flat kernel, or spectral clustering, among others.

In certain aspects, video database 252 stores the training vectors (e.g., a 256 dimensional vector) for each video clip in video database 252. Each video clip in video database 252 is mapped to its corresponding set of training vector using a unique index value for the video clip that is listed in an index. The training vectors for a video clip captures the visual nature of the corresponding media file (e.g., of a corresponding image). In some embodiments, a video clip is split into subsets of frames. A unique training vector is associated to each subset of frames in the video clip, the unique vector capturing the spatial and temporal attributes of the video clip. The training vector is such that given a pair of training vectors for a corresponding pair of subset frames of video clips, similarity calculations between the pair of training vectors (e.g., a cosine similarity algorithm) can meaningfully capture a visual similarity between the corresponding subset frames of video clips. In certain aspects, training vectors may be normalized (e.g., to be the same scale) prior to later processing (e.g., prior to applying the cosine similarity algorithm) in order to expedite such later processing.

CNN 240 can be used to train a model to generate training vectors for media files, such as for video clips, and map each video clip to its corresponding training vectors in a 'dense' vector space, wherein density is associated with a number of training vectors in a unit volume of the vector space. A distance in the vector space can be calculated between points associated with the training vectors.

Memory 232 also includes an annotated training database 250. Annotated training database 250 may be targeted data gathered via third-party crowd-sourcing platforms (e.g., MTurk, CrowdFlower, etc.). Annotated training database 250 may include images from video database 252 that are human annotated with information indicating a quality type of the video clip or video summary according to a user that judged the video clip via one of the third-party crowd-sourcing platforms. Annotated training database 250 may be utilized to further refine the training of CNN 240.

Although training database 248 is illustrated as being separate from video database 252, in certain aspects training database 248 is a subset of video database 252. Furthermore, although video database 252 and video search engine 242 are illustrated as being part of memory 232, in certain aspects video database 252 and the video search engine 242 can be hosted in a memory of a second server that is accessible by the server 130 illustrated in FIG. 2.

Memory 232 also includes a relevance feedback database 246. In some aspects, processor 236, using relevance feedback database 246, can tag each of the images in video database 252 with metadata identifying an index to a corresponding score in relevance feedback database 246 and an index to a style class in a scene recognition database 244. The metadata may be a metadata file stored as a flat document or an index identifying a storage location in video database 252. For example, the metadata file may include one or more rows of data including a video identifier, an video URL and a style identifier (e.g., identifying the corresponding style class).

Memory 232 also includes an interaction history database 254. In certain aspects, processor 236 is configured to modify interaction history database 254 by obtaining user interaction data identifying interactions with video clips from video search results that are responsive to search queries. For example, processor 236 may determine that a user interacted with an image from a search result, such as by clicking on the video, saving the video for subsequent access, or downloaded the video to a client (e.g., client 110), or the like. Processor 236 may keep track of the user interactions with a number of video clips over a given time period. The interaction history 254 may also include data indicating search behavior (and/or patterns) relating to prior video search queries.

Processor 236 is configured to execute instructions, such as instructions physically coded into processor 236, instructions received from software in memory 232, or a combination of both. For example, processor 236 of server 130 executes instructions to submit a plurality of training video clips containing content identifying different semantic concepts (e.g., woman, coffee, beach, soccer) to CNN 240 that is configured to analyze image pixel data collected from different frames in a time sequence from a scene for each of the plurality of training video clips to identify selected features. The selected features may correspond to a particular semantic concept. Processor 236 may receive, from CNN 240 and for each of the plurality of training video clips, an identification of one or more style classes corresponding to the video processed by CNN 240.

In certain aspects, processor 236 is configured to receive a user input from a user. The user input identifies a search query in a given natural language. For example, the search query may be entered as an English term. A user of the client 110 may use input device 214 to submit a search term or phrase via a user interface of application 222. The user interface may, for example, include an input section where the search term or phrase may be typed in. The input section may include one or more controls to allow the user to initiate the video search upon receiving the search query. In some aspects, the video search may be initiated automatically upon receiving at least one search term (or at least the search phrase in part). As described herein, the natural language used is not limited to English, and the number of natural languages can vary to include other natural languages depending on implementation.

The search query is provisioned to video search engine 242 for initiating the video search through video database 252. The user input is provided, for example, by the user accessing the video search engine 242 over network 150 using application 222 in memory 220 on client 110, and the user submitting the user input with input device 214. For example, the user may use input device 214 to enter a text-based search term or phrase. In response to the user input via application 222, processor 212 is configured to transmit the search query over network 150 using communications module 218 to communications module 238.

Processor 236, upon receiving the search query for video search engine 242, submits a search request for the search query to video search engine 242. Processor 236 then receives an identification of a plurality of video clips, with varying levels of relevance (e.g., using relevance feedback database 246), from video database 252 that are responsive to the search query, and is configured to provide a listing of video clips with a ranking (or prioritization) according to a relevance search probability (e.g., using interaction history database 254). The listing of video clips that is prioritized (or ranked) according to the user interaction probabilities is provided, for example, by processor 236 as a set of training video clips (e.g., training database 248 and annotated training database 250) to CNN 240 prior to the search query being received. Processor 236, using a logistic regression model, identifies the level of relevance for each of the video clips in video database 252. Processor 236 may further provide the listing of video clips to application 222 over network 150 for display by output device 216.

Figure 3:
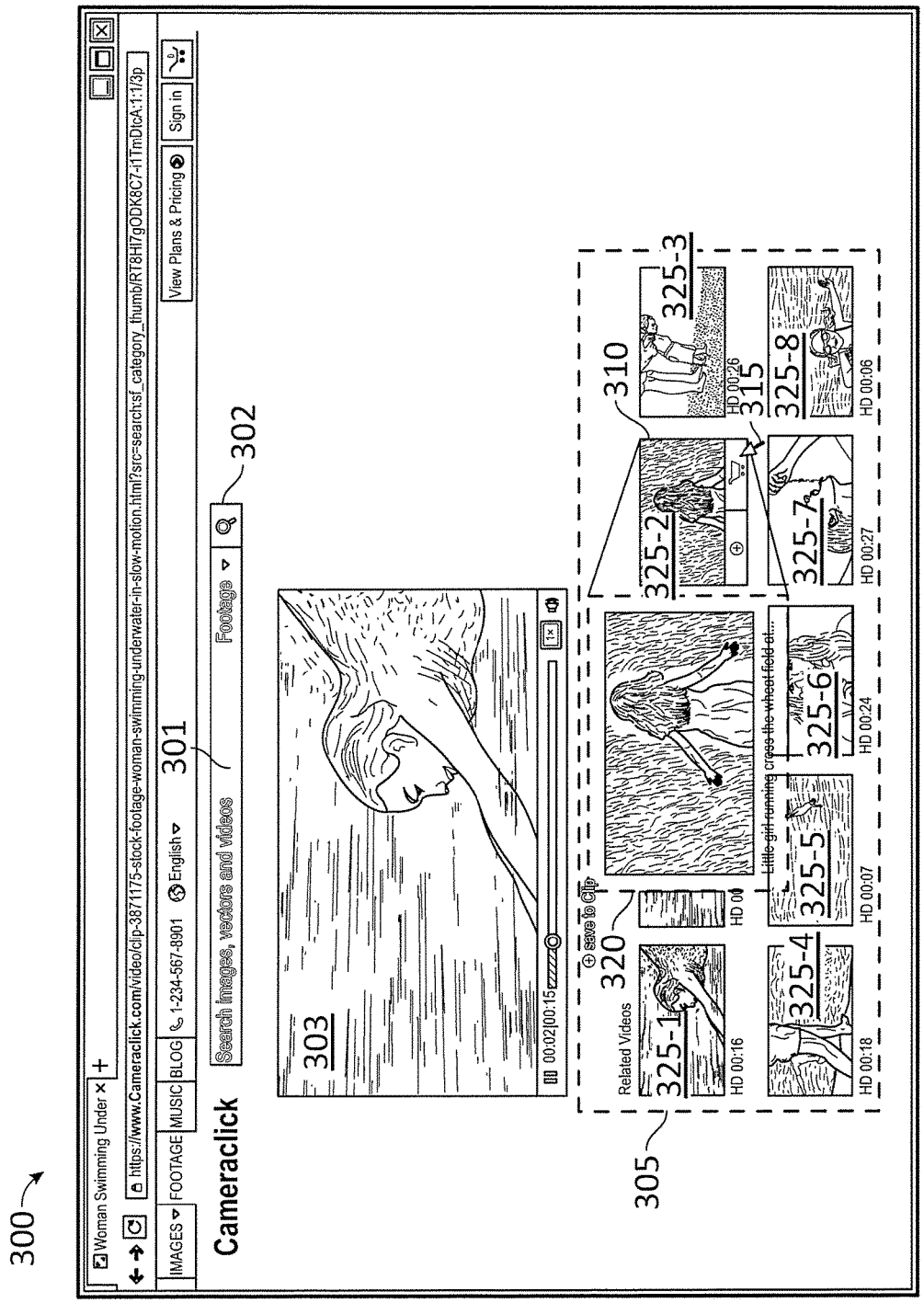
FIG. 3 illustrates a user interface of a search engine including search results for a search query in a server including a thumbnail displaying a video summary of at least one video clip, according to some embodiments.

FIG. 3 illustrates a user interface 300 of a search engine including search results 305 for a search query 301 in a server (e.g., any one of servers 130) including a thumbnail 325-1 displaying a video summary of at least one video clip 303, according to some embodiments. User interface 300 may be displayed in a client device (e.g., any one of client devices 110), which includes a pointing device 315 with which the user may access different elements in user interface 300. In user interface 300, a user enters a search query 301 for a video clip in a search field 302. Search query 301 may include text describing the video clip content in any language. For example, and without limitation, search query 301 may include the text "young girl swimming" when the user is interested in watching a video of a young girl swimming (e.g., for swimsuit designs).

Video clip 303 is the most relevant result of the search query, and therefore it may be displayed in a prominent position in user interface 300. Lower panel 305 in interface 300 includes multiple thumbnails 325-1, 325-2, 325-3, 325-4, 325-5, 325-6, and 325-7 (collectively, hereinafter referred to as thumbnails 325) resulting from search query 301. In some embodiments, a video summary stored in a video database (e.g., video database 252) is played when pointing device 315 hovers over each of thumbnails 325. Based on the video summary, the user may determine that the corresponding video clip deserves a more careful analysis and decide to stream or download the entire video clip form the server.

In the illustrative example, a video summary 320 of a video clip 310 is configured to play automatically when pointing device 315 from the user hovers over thumbnail 325-2. However, video summary 320 may show a little girl walking through a wheat field, which may be quickly discarded by the user who may only be interested in swimming scenes. The user may then direct pointing device 315 over a few more thumbnails 325 in lower panel 305 in order to watch the corresponding video summaries and decide whether or not the video clips are of interest for viewing or downloading in their entirety.

Figure 4:
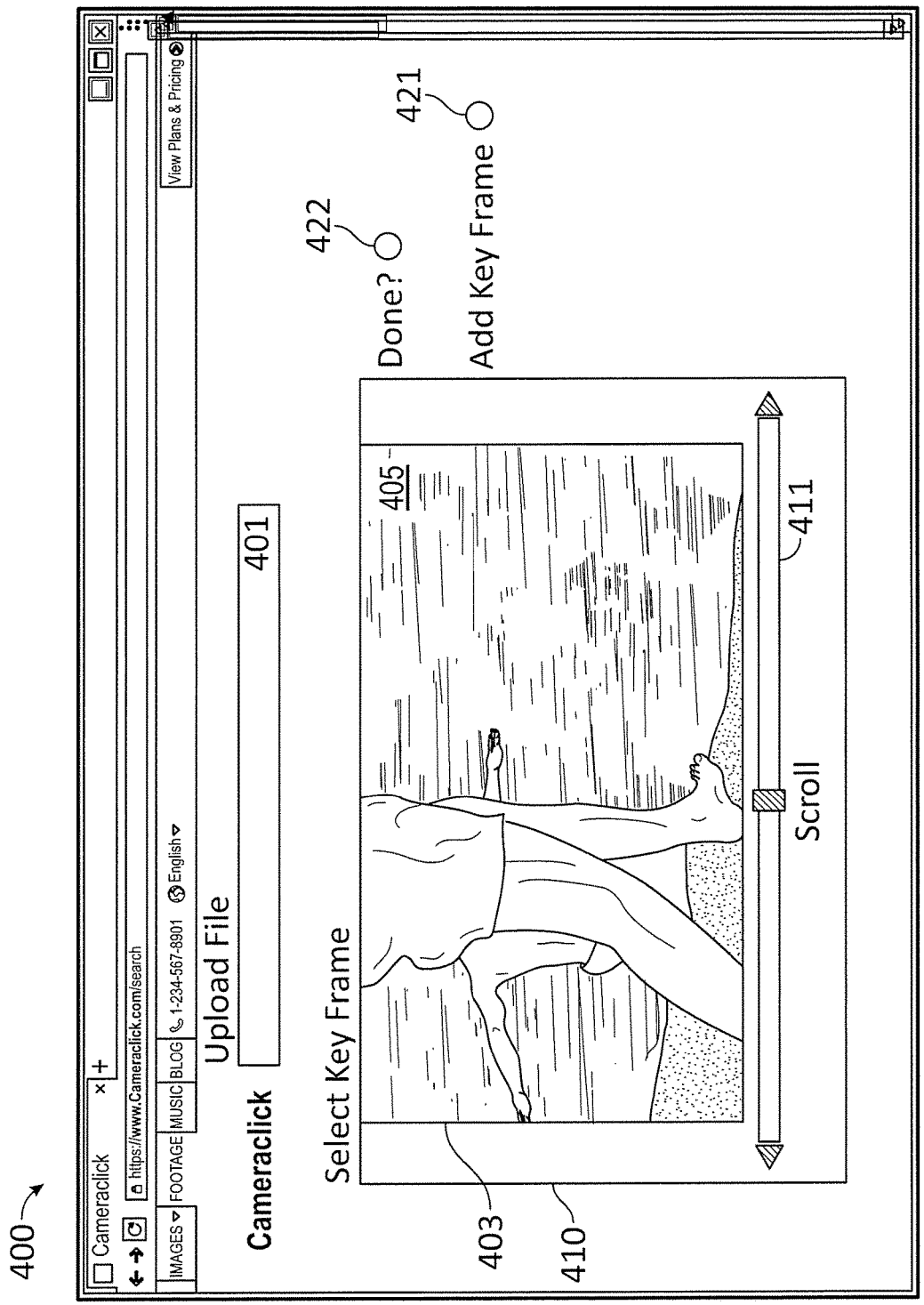
FIG. 4 illustrates a user interface for creating a video summary of a video clip in a server, according to some embodiments.

FIG. 4 illustrates a user interface 400 for creating a video summary of a video clip 403 in a server, according to some embodiments. In some embodiments, the server causes a client device with the user to display user interface 400 upon a user login onto the server (e.g., any one of clients 110 and servers 130). Interface 400 may be displayed by the server after the user has uploaded video clip 403 to a private account on the server. The uploading process may include a server prompt for the user to select an address 401 for a file document including video clip 403. User interface displays a window 410 including video clip 403 and a scrolling tool 411 configured to receive a user selection of a frame that the user may select as a key frame 405 from video clip 403. Once the user moves scrolling tool 411 to the selected key frame 405, the user may enter the selection by activating button 421. The user may desire to enter more than one key frame 405 for the video summary, in which case the user moves scrolling tool 411 to a new key frame, and activates button 421 again. This process may be repeated for as many key frames as the user desires to select to obtain an accurate and complete video summary of video clip 403. When the user is satisfied with the key frame selection, the user activates a completion button 422.

Upon activation of completion button 422, the server 130 enters the selected key frame(s) into a nonlinear algorithm as disclosed herein to obtain a video summary of video clip 403 (e.g., CNN 240). In some embodiments, the video summary is stored in the same address as video clip 403 (e.g., in video database 252). Moreover, the server 130 may configure the video summary to play automatically upon detection of the pointer device within a field showing video clip 403 as a result of a search query (e.g. pointing device 315 on thumbnail 310).

Address 401 may include a local folder in the hard drive of a client computer, or a universal resource locator (URL) address for an internet folder where the user stores video clip 403. Moreover, in some embodiments address 401 may include a URL address for a video clip 403 stored in a database associated with a private user account of the server (e.g., video database 252). For example, in some embodiments the user may desire to change or edit a video summary of video clip 403 previously saved in the server.

Figure 5:
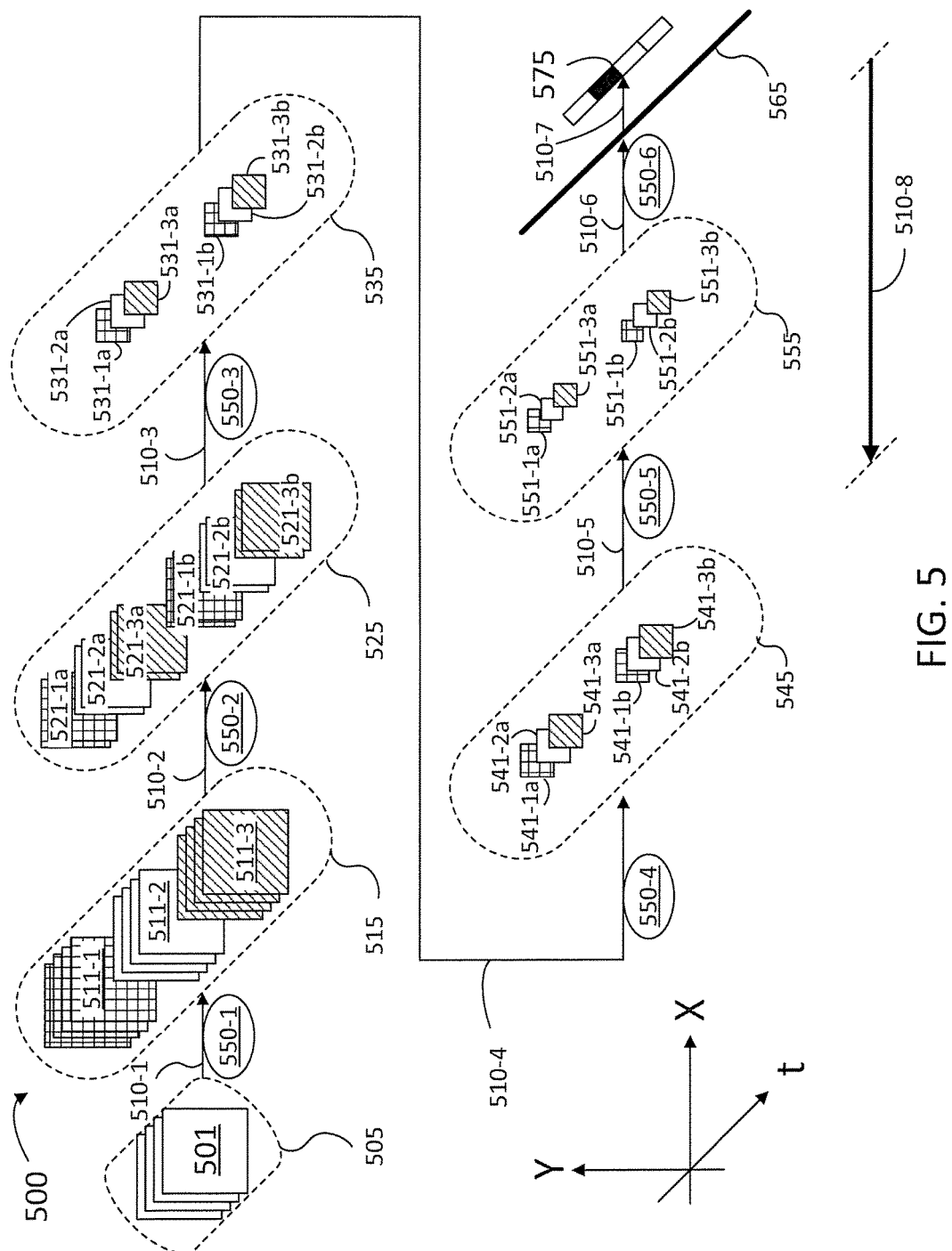
FIG. 5 is a block diagram illustrating a process network, according to some embodiments.

FIG. 5 is a block diagram illustrating a process network 500 according to some embodiments. Without limitation, process network 500 may include a 3D CNN trained to perform automatic video summaries from a video clip input and a key frame in the video clip input (e.g., CNN 240, video clip 403, and key frame 405). Accordingly, the video clip and the key frame may be provided by a user with a client device for storage and processing in a server (e.g., any one of client devices 110 and servers 130).

In embodiments consistent with the present disclosure, process network 500 includes a correlation over a time sequence of video frames in addition to the correlation in a two-dimensional (2D) spatial picture frame. The time sequence of video frames may include a scene in the video clip. At least one of the frames in the scene may be the key frame, or may be provided automatically by the server in which the video clip is stored. The specific 3D CNN architecture used in process network 500 is not limiting of embodiments consistent with the present disclosure. A 3D CNN architecture as illustrated in process network 500 generates multiple classes of information from adjacent video frames and performs convolution and subsampling operations separately in each class. The final feature representation is obtained by combining information from all classes.

Process network 500 includes a stack of layers 510-1, 510-2, 510-3, 510-4, and 510-5, followed by at least one fully connected layer 510-6, and a loss layer 510-8 (hereinafter, collectively referred to as layers 510). Each of layers 510 is associated with a set of weighting factors 550-1, 550-2, 550-3, 550-4, 550-5, and 550-6 (hereinafter collectively referred to as weighting factors 550). In some embodiments, layers 510 include the node layers in a 3D CNN, wherein the node values in one of layers 510 have a functional relation with the node values in the preceding layer. Accordingly, weighting factors 550 include values affecting the functional relation between nodes in one layer and in the preceding layer. The functional relation between two adjacent layers 510 typically involves non-linear operations (e.g., in a 3D CNN) modulated by weighting factors 550. In some embodiments, process network 500 is trained using regression and sigmoid cross entropy loss calculations to adjust weighting factors 550.

An initial frame set 501 includes 'k' different frames selected from the video clip. The value of 'k' may be any integer, typically a low number, such as four (4), seven (7), and the like. The 'k' frames are 2D pixel frames corresponding to still video frames from the video clip. Desirably, the initial set of 'k' frames includes the key frame selected by the user. In some embodiments, it is desirable that the 'k' different frames from initial frame set 501 be contiguous frames, where contiguity means frames that are closely related in time (e.g., in a sequential order) in the video clip. In some embodiments, it is desirable initial frame set 501 includes at least one frame captured before the key frame and one frame captured after the key frame. Accordingly, process network 500 may be able to capture detailed motion information encoded in initial frame set 501.

As a non-limiting example for illustrative purposes only, a video clip may include 100 frames of size 60·40 pixels (X·Y dimensions). The user may select frame 70 as the key frame. Without limitation, and for illustrative purposes only, an initial frame set 501 with k=4 forms a 3D dataset 505 that has a dimensionality 4·60·40. Note that the four frames from initial frame set 501 may include any four frames from the 100 frames in the video clip, with one of them being key frame number 70.

Layer 510-1 includes a convolution acting on a 3D dataset 505 formed by stacking multiple contiguous frames 501 via a set of weighting factors 550-1. In some embodiments, layer 510-1 includes using different convolutions encoding hardwired kernels stored in memory (e.g., training database 248) based on a prior knowledge of features. In layer 510-1, the number of inputs and outputs for the network is set so that the same number of frames (e.g., 'k') will be stacked in every forward pass (e.g., k=4 in the illustrative example).

In layer 510-1, a 2D convolution step results in separation of frames 501 into classes 511-1, 511-2 and 511-3 (hereinafter, collectively referred to as 'classes 511'). Classes 511 may include, for example, a gray-scale class, a gradient class, an optical flow class, among other possible classes. The gray-scale class contains gray pixel values of input frames 501. The gradient class is obtained by computing gradients (e.g., gradient of intensity, color hue, and the like) along the horizontal (X) and vertical (Y) directions of input frames 501. The optical flow class contain the optical flow fields, along the horizontal (X) and vertical (Y) directions, respectively, of input frames 501. Layer 510-1 includes performing computations between sequentially adjacent (e.g., along the time axis) frames among input frames 501. For example, when one of classes 511 includes an optical flow class, layer 510-1 computes a 2D vector field for objects in one of input frames 501, each 2D vector indicating the movement of the object (e.g., direction and speed) relative to an adjacent input frame in the sequence. The object may be a single pixel in the frame, or a plurality of pixels forming a distinct shape in the frame.

Each of classes 511 includes four frames, corresponding to the number of frames from initial frame set 501. The X·Y dimension of the frames in classes 511 may be the same as for the frames from initial frame set 501 (e.g., 60·40). In the illustrative example, a 3D dataset 515 in layer 510-1 may have a dimension 12·60·40, where the factor 12 corresponds to the k=4 time sequence video frames times the three classes identified in layer 510-1.

In layer 510-2 a 3D convolution is performed to 3D data set 515 to obtain a 3D dataset 525 via a set of weighting factors 550-2. In some embodiments, layer 510-2 includes a time-sensitive convolution splitting frames 511 into early frames 521-1*a*, 521-2*a* and 521-3*a* (hereinafter collectively referred to as 'early frames 521*a*') and late frames 521-1*b*, 521-2*b* and 521-3*b* (hereinafter collectively referred to as 'late frames 521*b*'). The time-sensitive convolution illustrated in layer 510-2 may include multiple convolutions. Accordingly, the result of a time-sensitive convolution may include more than only two different time-sensitive types other than early and late, but also, for example, a fast motion and a slow motion type, and any combination thereof. In general, a time-sensitive convolution may discriminate between types of events including moving objects or patterns, and also static scenes that evolve in time. In some embodiments a time-sensitive type selected in layer 510-2 may include a distinction between events such as 'sunset,' sunrise,' or any other time of day, based on a difference in color gradients in the X and Y direction between successive 2D pixel frames in 3D data set 515.

Class 1 includes early frames **521-*l**a* and late frame 521-1*b*, class 2 includes early frame 521-2*a* and late frame 521-2*b*. And class 3 includes early frame 521-3*a* and late frame 521-3*b*. Hereinafter, early frames 521*a* and late frames 521*b* will be referred to as 'frames 521'. In the illustrative example above, process network 500 in layer 510-2 performs a 7×7×3 convolution over the 12·60·40 3D data set 515. As a result of the 7× convolution in the X·Y dimension, frames 521 have a 2D size 54×34, and the 3D dataset 525 has dimensionality 8×54×34.

In layer 510-3 a 2D subsampling is performed on 3D data set 525 to obtain a 3D dataset 535 via a set of weighting factors 550-3. In some embodiments, the 2D subsampling in layer 510-3 operates in the X·Y dimension of 3D data set 525. A 2D subsampling operation includes reducing the dimensionality of 3D data set 525 in a 2D projection (e.g., in the X·Y plane), by some mathematical or statistical operation. For example, a 2×2 subsampling replaces a 2×2 portion of a frame in 3D data set 525 by a single entry value in 3D dataset 535. The single entry value may be an average, an interpolation, a mean, or any other suitable mathematical function of the four entry values in the 2×2 portion.

In some embodiments, layer 510-3 includes early frames 531-1*a*, 531-2*a* and 531-3*a* (hereinafter collectively referred to as 'early frames 531*a*') and late frames 531-1*b*, 531-2*b* and 531-3*b* (hereinafter collectively referred to as 'late frames 531*b*'). Class 1 includes early frames **531-*l**a* and late frame 531-1*b*, class 2 includes early frame 531-2*a* and late frame 531-2*b*. And class 3 includes early frame 531-3*a* and late frame 531-3*b*. Hereinafter, early frames 531*a* and late frames 531*b* will be referred to as 'frames 531'. In the above illustrative example, process network 500 in layer 510-3 performs a 2×2 subsampling over 3D dataset 525 having dimensions 8×54×34. As a result of the 2×2 subsampling in the X·Y dimension, frames 531 have a 2D size 27×17 (X·Y), and 3D dataset 535 has dimensionality 8×27×17.

In layer 510-4 a 3D convolution is performed on 3D data set 535 to obtain a 3D dataset 545 via a set of weighting factors 550-4. In some embodiments, layer 510-4 includes early frames 541-1*a*, 541-2*a* and 541-3*a* (hereinafter collectively referred to as 'early frames 541*a*') and late frames 541-1*b*, 541-2*b* and 541-3*b* (hereinafter collectively referred to as 'late frames 541*b*'). Class 1 includes early frame **541-*l**a* and late frame 541-1*b*, class 2 includes early frame 541-2*a* and late frame 541-2*b*. And class 3 includes early frame 541-3*a* and late frame 541-3*b*. Hereinafter, early frames 541*a* and late frames 541*b* will be referred to as 'frames 541'. In the above illustrative example, process network 500 in layer 510-4 performs a 7×6×3 convolution over 3D data set 535 with dimensions 8·27·17. As a result of the 7× convolution in the X·Y dimension, frames 541 have a 2D size 21·12, and 3D dataset 545 has dimensionality 6×21×12.

In layer 510-5 a subsampling is performed on 3D data set 545 to obtain a 3D dataset 555 via a set of weighting factors 550-5. In some embodiments, layer 510-5 includes early frames 551-1*a*, 551-2*a* and 551-3*a* (hereinafter collectively referred to as 'early frames 551*a*') and late frames 551-1*b*, 551-2*b* and 551-3*b* (hereinafter collectively referred to as 'late frames 551*b*'). Class 1 includes early frames **551-*l**a* and late frame 551-1*b*, class 2 includes early frame 551-2*a* and late frame 551-2*b*. And class 3 includes early frame 551-3*a* and late frame 551-3*b*. Hereinafter, early frames 551*a* and late frames 551*b* will be referred to as 'frames 551'. In the above illustrative example, process network 500 in layer 510-5 performs a 3×3 subsampling over the 6×21×12 data set from layer 510-4. As a result of the 3×3 subsampling in the X·Y dimension, frames 551 have a 2D size 7×4, and 3D dataset 555 has dimensionality A·7×4.

In layer 510-6 a 2D convolution is performed to 3D dataset 555 to obtain a dataset 565 having a single dimension (a vector) via a set of weighting factors 550-6. In some embodiments, layer 510-6 includes a 1D dataset 565. In the above illustrative example, process network 500 in layer 510-6 performs a 7×4 convolution over the A·7×4 data set from layer 510-5. As a result of the 7×4 convolution in the X·Y dimension, dataset 565 is a vector having N components (1 dimension: N×1×1).

Layer 510-7 includes forming an output set (selector) 575 having the same number of entry values as the number of input frames 501 (e.g., 'k'). In some embodiments, layer 510-7 includes forming a vector having 'k' components using a full connection on the N components of dataset 565, where k is the number of video clip frames entered in layer 510-1. As a result, selector 575 is a vector of size 'k' (the number of video clip frames selected to enter layer 510-1). In the illustrative example above, selector 575 is a 4 dimensional vector, all of whose values will be '0', except in the index associated with the key frame, where the value is expected to be '1'. Accordingly, in some embodiments selector 575 may be such that all inputs may not be exactly equal to '0' but negligibly small, while one of the inputs in the index associated with the key frame may have a value close, but not exactly equal, to '1'.

Loss layer 510-8 performs a reverse analysis to adjust weighting factors 550 the process network. Accordingly, process network 500 is trained to include weighting factors 550 directed to obtain a k-dimensional output set (e.g., selector 575) having all zero (or approximately zero) entry values except for the one corresponding to the selected key frame, which has a value of one (or approximately one) when the k input frames 501 are entered.

When process network 500 is trained with desirable weighting factors 550, it can be used to generate video summaries of video clips. Given segments of input video selected in mutually exclusive groups of 4 frames each, the network formed from process network 500 generates probabilities of each frame of the original clip being a key frame. Once the probabilities over all the frames have been provided, the top 'm' frames are selected, where 'm' may be any desired integer associated with the length of the video summary. Once the top-m frames are selected, they are presented as a summary in the sequence corresponding to their timestamp in the video. In some embodiments, a clustering step using cluster information stored in a video database (e.g., video database 252) may be used to choose 'm' frames that belong in as many different clusters as available to increase the diversity of the summary (e.g., 'm').

The level of video compression achieved in a network trained as shown in process network 500 may range widely, depending on the user desire. In some embodiments, a video clip lasting approximately five minutes (5*m*) may be compressed into a video summary lasting five seconds (5*s*).

Figures 6A, 6B:
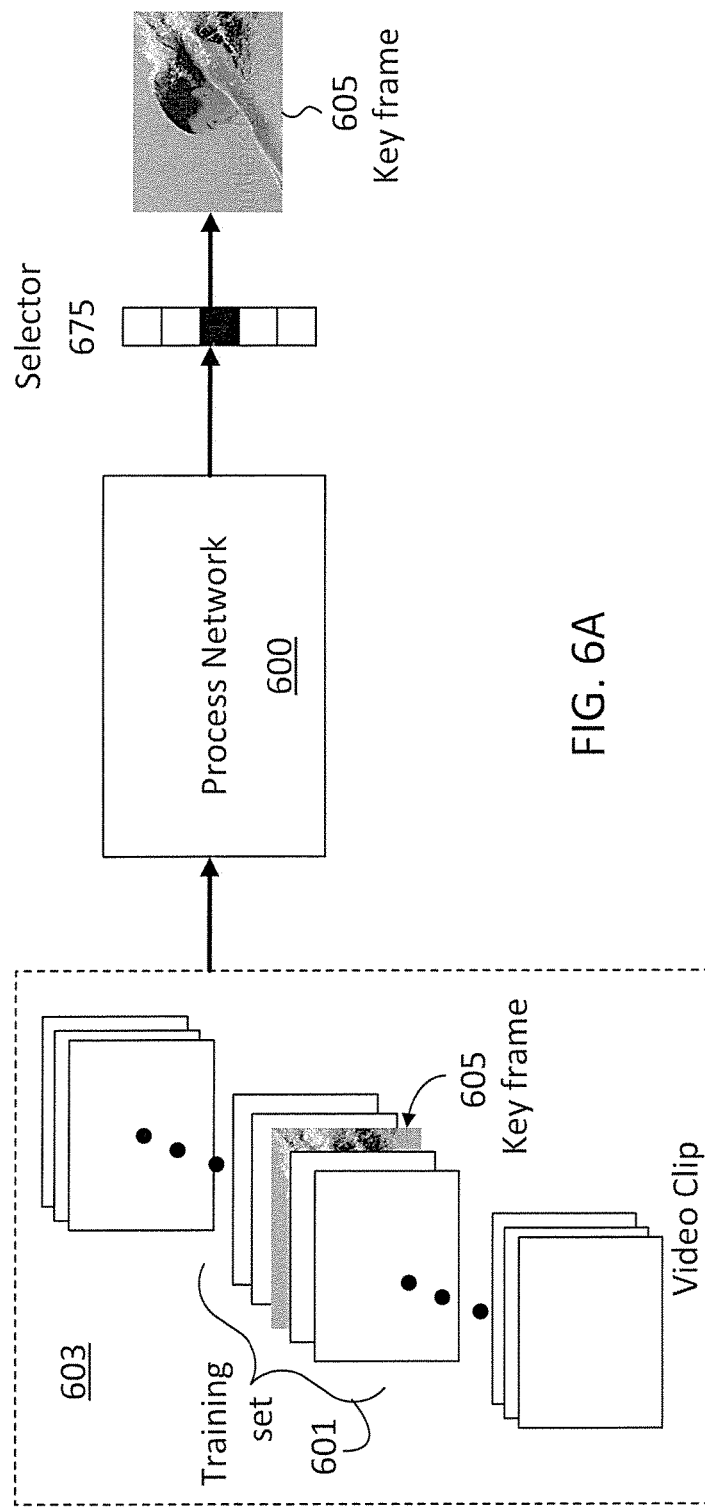
FIGS. 6A-B are a walk-through illustration for training and applying a process network, according to some embodiments.

FIGS. 6A-B are a walk-through illustration for training and applying a process network 600 for generating a video summary 620 of a video clip 603, according to some embodiments. FIG. 6A illustrates the training of process network 600 when video clip 603 has the relevant feature of a young girl swimming. Accordingly, the user may select a frame 605 as the key frame for the video. Key frame 605 includes a young girl immersed in water. The user may select five frames in video clip 603 including two frames prior and two frames after key frame 605 as initial frame set 601 (cf. initial frame set 501), which will be the training set for process network 600. Process network 600 includes several layers (cf. process network 500) with weighting factors (e.g. weighting factors 550) adjusted so that the five frames in initial frame set 601 result in a selector 675 (cf. selector 575). Selector 675 includes five entries, of which the middle entry, corresponding to key frame 605 is the only non-zero entry. When selector 675 has the desired characteristics according to the selected key frame, process network 600 is ready to be used for generating video summary 620 of video clip 603. Note that process network 600 may include, in addition to initial frame set 601, an input including a textual description of a relevant feature in video clip 603, according to the user.

FIG. 6B illustrates applying process network 600 to video clip 603. Accordingly, process network 600 is applied to five input frames from video clip 603. Process network 600 provides a selector 675 that may be non-zero in at least one entry. Of the five input frames, the frame corresponding to the non-zero entry in selector 675 is selected to form video summary 620. In some embodiments, the five entries in selector 675 may be non-zero, and process network 600 is configured to select the frame corresponding to the highest entry value in selector 675. Moreover, in some embodiments more than one frame of the input frames may be selected for video summary 620 when more than one entry in selector 675 is higher than a threshold value. Further, in some embodiments the five entries in selector 675 may be zero, or close to zero, or have values below the pre-selected threshold. In such cases, none of the input frames may be selected for video summary 620.

Accordingly, in some embodiments process network 600 may be applied to all the frames in video clip 603 (in input frame sets of five frames each), and selectors 675 corresponding to all the input frame sets may be joined to form a total selector with a length equal to the total number of frames in video clip 603. Thus, the frames corresponding to entries in the total selector having a value higher than the pre-selected threshold may be used in video summary 620.

Figure 7:
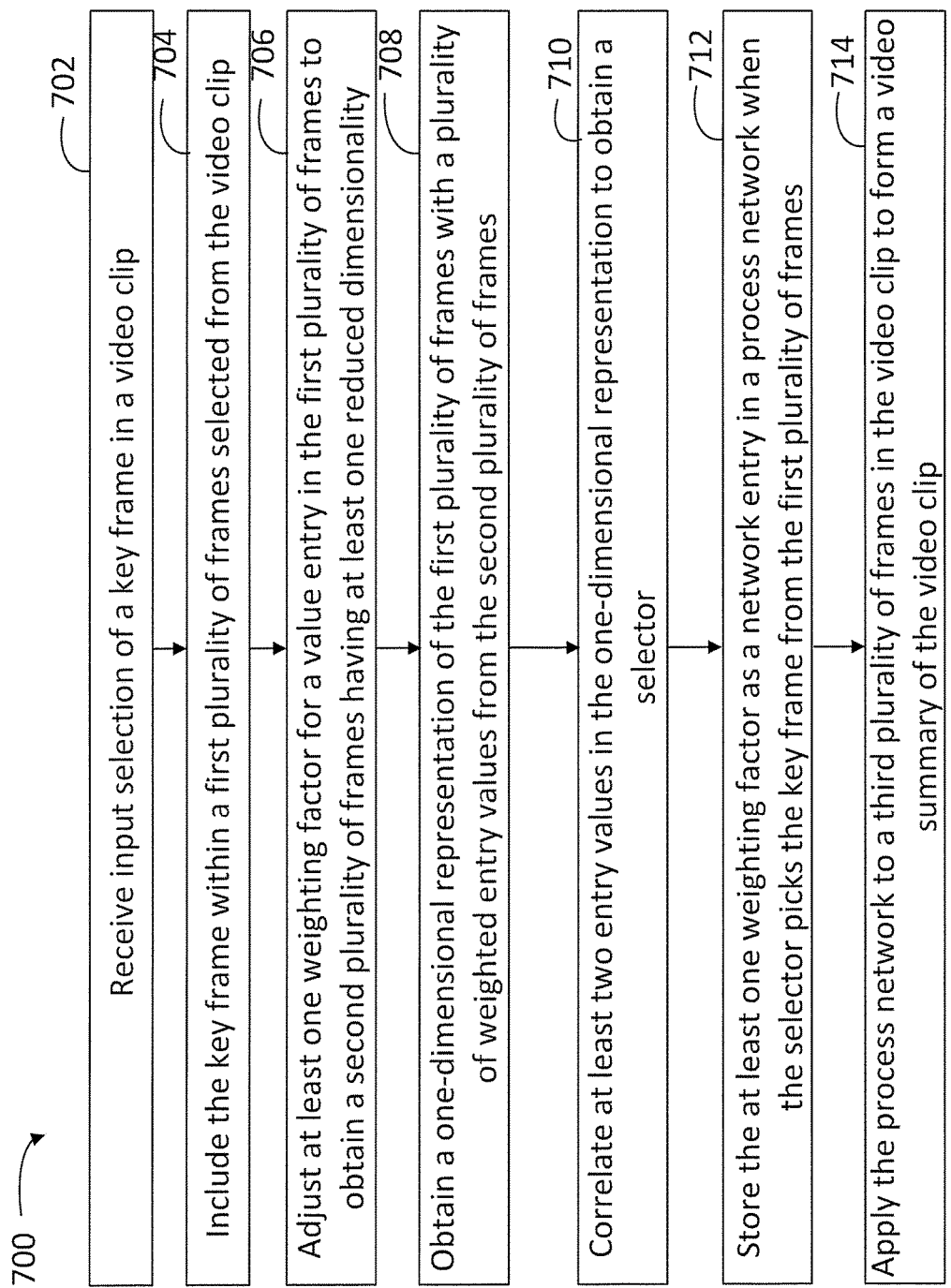
FIG. 7 illustrates a block diagram including steps in a method according to some embodiments.

FIG. 7 illustrates a block diagram including steps in a method 700 according to some embodiments. Method 700 may be performed at least partially by any one of network servers hosting a collection of images, video clips, and multimedia files, while communicating with any one of a plurality of client devices (e.g., servers 130 and clients 110). At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer (e.g., collection of images 252 and interaction history data 254). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes receiving an input selection of a key frame in a video clip. In some embodiments, step 702 includes receiving a text string describing a feature of the key frame, and storing the text string in an annotated training database (e.g., annotated training database 250).

Step 704 includes forming a first plurality of frames selected from the video clip, and including the key frame within the first plurality of frames.

Step 706 includes adjusting at least one weighting factor for a value entry in the first plurality of frames to obtain a second plurality of frames having at least one reduced dimensionality (e.g., frames 511, 521, 531, 541, and 551). In some embodiments, step 706 includes convolving a plurality of entry values in the first plurality of frames in at least one dimension. In some embodiments, step 706 includes sub-sampling a plurality of entry values in the first plurality of frames in at least one dimension. In some embodiments, step 706 may further include training a 3D CNN on the first plurality of frames.

Step 708 includes obtaining a one-dimensional representation of the first plurality of frames with a plurality of weighted entry values from the second plurality of frames (e.g., dataset 565).

Step 710 includes correlating at least two entry values in the one-dimensional representation to obtain a selector (e.g., selector 575). In some embodiments, step 710 includes adjusting at least another weighting factor to ensure that a value of 'one' is associated with the key frame. In some embodiments, step 710 includes adjusting at least another weighting factor to ensure that a value of 'zero' is associated with a frame in the first plurality of frames other than the key frame.

Step 712 includes storing the at least one weighting factor as a network entry in a process network when the selector picks the key frame from the first plurality of frames.

Step 714 includes applying the process network to a third plurality of frames in the video clip to form a video summary of the video clip. In some embodiments, step 714 includes applying the process network to the third plurality of frames from the video clip. In some embodiments, step 714 includes obtaining a second selector for the third plurality of frames from the video clip and selecting a summary frame for the video summary from the third plurality of frames based on a corresponding entry for the summary frame in the second selector. Further, in some embodiments step 714 includes automatically obtaining the key frame when a user uploads the video clip.

Figure 8:
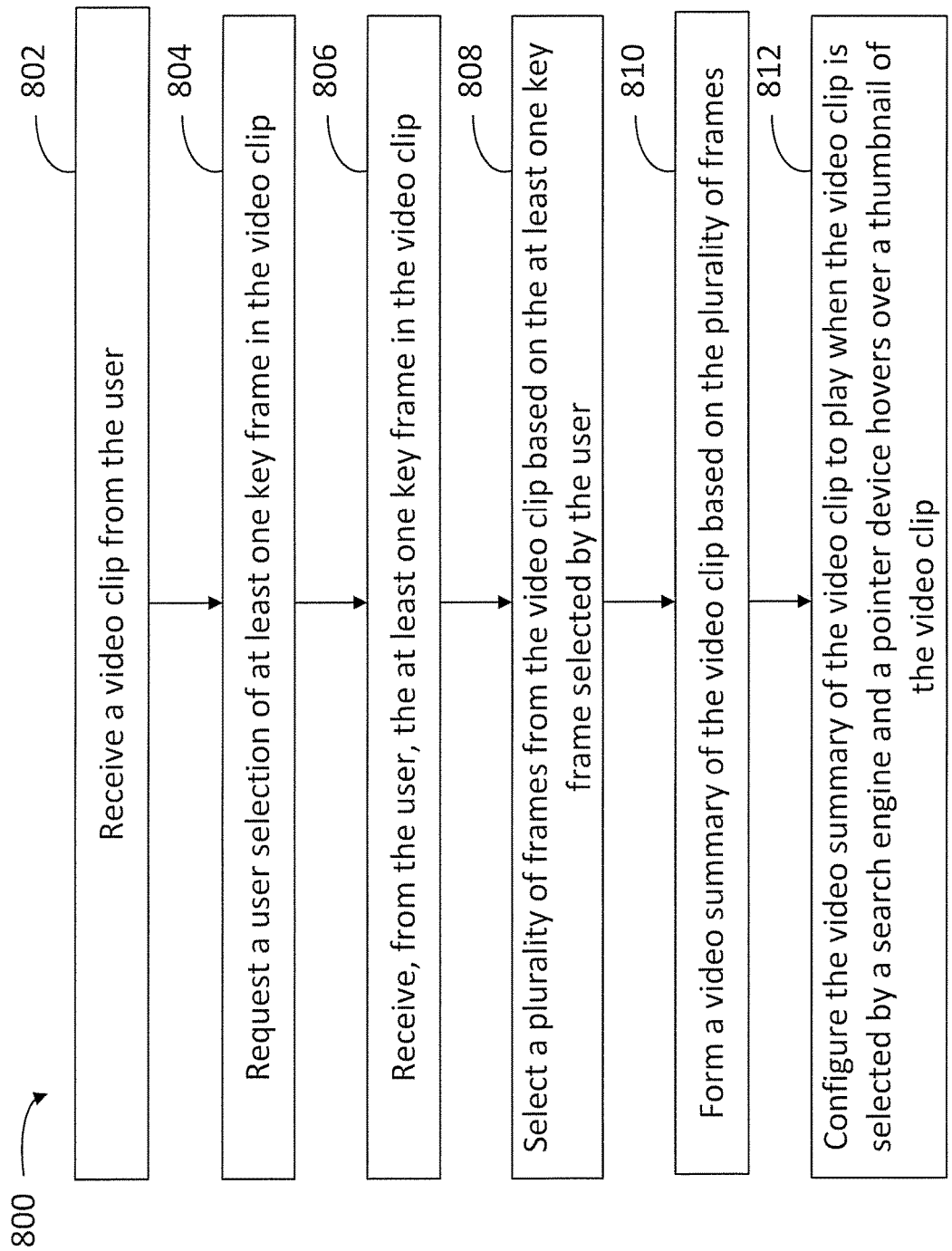
FIG. 8 illustrates a block diagram including steps in a method according to some embodiments.

FIG. 8 illustrates a block diagram including steps in a method 800 according to some embodiments. Method 800 may be performed at least partially by any one of network servers hosting a collection of images, video clips, and multimedia files (e.g., video clips 302), while communicating with any one of a plurality of client devices (e.g., servers 130 and clients 110). The client devices may be handled by a user, wherein the user may be registered to a private account with the server, or may be a visitor to the server website or logged in a server application installed in the client device. At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer (e.g., video database 252, annotated training database 250 and interaction history data 254). Methods consistent with the present disclosure may include at least some, but not all of the steps illustrated in method 800, performed in a different sequence. Furthermore, methods consistent with the present disclosure may include at least two or more steps as in method 800 performed overlapping in time, or almost simultaneously.

Step 802 includes receiving a video clip from the user. Step 804 includes requesting a user selection of at least one key frame in the video clip. In some embodiments, step 804 includes prompting the user to select the key frame from a video clip with a scrolling tool on a display in a client device.

Step 806 includes receiving, from the user, the at least one key frame in the video clip. Step 806 may also include receiving, from the user, a text string with annotated data associated with the key frame. The annotated data may include a single word or a phrase capturing the relevant feature in the key frame or in the video clip that the user desires to emphasize.

Step 808 includes selecting a plurality of frames from the video clip based on the at least one key frame selected by the user. In some embodiments, step 808 includes selecting a frame sequence with a frame captured before the key frame and a frame captured after the key frame. In some embodiments, step 808 includes identifying images in the video database based on comparing the annotated data associated with the key feature with data in the annotated training database. Further, step 808 may include generating pairs of "positive" and "negative" example images associated with the key frame selected by the user. Step 808 may then determine a distance in the dense vector space between the key frame provided by the user to either of the positive and negative example images. When the distance to the positive image is shorter than the distance to the negative image, then step 808 may validate and use the key frame provided by the user. When the distance to the negative image is shorter than or equal to the distance to the positive image, step 808 may reject the key frame selected by the user and instead randomly select any other frame in the video clip as a key frame.

Step 810 includes forming a video summary of the video clip based on the plurality of frames. In some embodiments, step 810 includes applying a process network to a sequence of frames from the video clip. In some embodiments, step 810 includes identifying a sequence of frames in the video clip as a relevant scene based on a selector in a process network. In some embodiments, step 810 includes identifying a sequence of frames in the video clip as a relevant scene based on an interaction history with the user. In some embodiments, step 810 includes identifying a sequence of frames in the video clip as a relevant scene based on an annotated training database including an input from a second user (e.g. annotated training database 250).

Step 812 includes configuring the video summary of the video clip to play when the video clip is selected by a search engine and a pointer device hovers over a thumbnail of the video clip.

Figure 9:
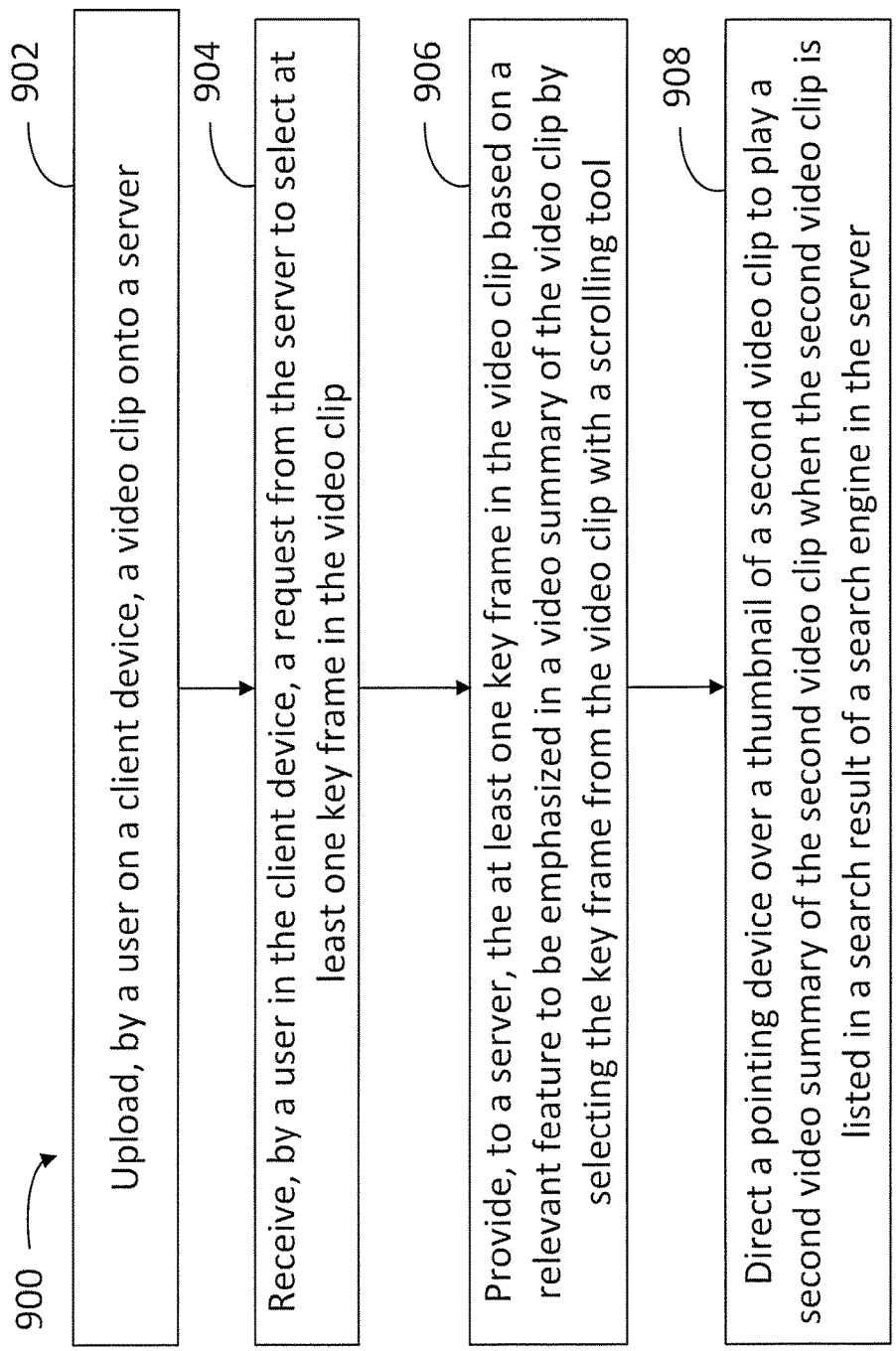
FIG. 9 illustrates a block diagram including steps in a method for uploading a video clip into a server, according to some embodiments.

FIG. 9 illustrates a block diagram including steps in a method 900 according to some embodiments. Method 900 may be performed at least partially by a user with a client device (e.g., any one of client devices 110) in communication with a network server hosting a collection of images, video clips, and multimedia files (e.g., any one of servers 130 and video clips 302). The user may be registered to a private account with the server, or may be a visitor to the server website or logged in a server application installed in the client device and providing a user interface in a display of the client device (e.g., user interface 300). At least some of the steps in method 900 may be performed by a computer having a processor executing commands stored in a memory of the computer (e.g., processors 212 and 236, memories 220 and 232). Further, steps as disclosed in method 900 may include retrieving, editing, and/or storing files in a database that is part of, or is communicably coupled to, the computer (e.g., collection of images 252 and interaction history data 254). Methods consistent with the present disclosure may include at least some, but not all of the steps illustrated in method 900, performed in a different sequence. Furthermore, methods consistent with the present disclosure may include at least two or more steps as in method 900 performed overlapping in time, or almost simultaneously.

Step 902 includes uploading, by the user of a client device, a video clip onto the server. Step 904 includes receiving, by the user in the client device, a request from the server to select at least one key frame in the video clip.

Step 906 includes providing, to the server, the at least one key frame in the video clip based on a relevant feature to be emphasized in a video summary of the video clip by selecting the key frame from the video clip with a scrolling tool provided in the user interface (e.g., scrolling tool 315). In some embodiments, step 906 includes selecting the key frame from the video clip with a scrolling tool provided in a user interface displayed of the client device (e.g., scrolling tool 411). In some embodiments, step 906 includes providing a text description of the video clip in the user interface displayed on the client device, such as a text description of the relevant feature.

Step 908 includes directing a pointing device over a thumbnail of a second video clip to play a second video summary of the second video clip when the second video clip is listed in a search result of a search engine in the server. In some embodiments, step 908 includes hovering the pointing device over the thumbnail. In some embodiments, the second video clip may include a second key frame selected by a second user.

Furthermore, in the case of browsing through a surveillance video to determine the occurrence of a discrete event within a long series of otherwise uneventful frames, a simple deletion of frames may still result in a large number of irrelevant frames included in the video summary, thereby wasting computer usage time, storage capacity, and user browsing time.

Hardware Overview

Figure 10:
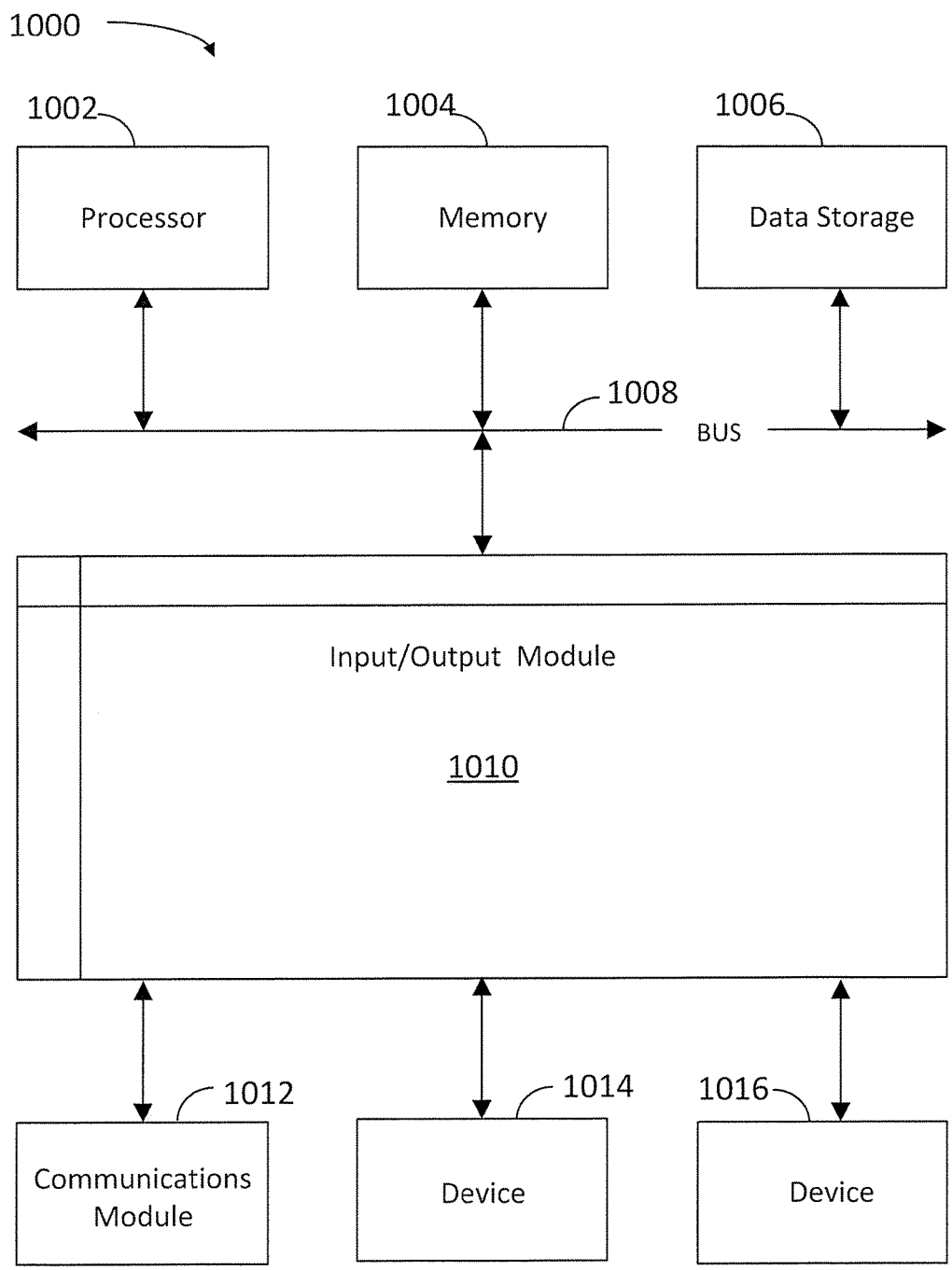
FIG. 10 is a block diagram illustrating an example computer system with which the client and server of FIG. 2 and the methods of FIGS. 7-9 can be implemented.

FIG. 10 is a block diagram illustrating an exemplary computer system 1000 with which the client 110 and server 130 of FIG. 1 can be implemented. In certain aspects, the computer system 1000 may be implemented using hardware or a combination of software and hardware, either in a dedicated server, or integrated into another entity, or distributed across multiple entities.

Computer system 1000 (e.g., any one of clients 110 and servers 130) includes a bus 1008 or other communication mechanism for communicating information, and a processor 1002 (e.g., processor 212 and 236) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 (e.g., communications modules 218 and 238) include networking interface cards, such as Ethernet cards and modems. In certain aspects, the input/output module 1010 is configured to connect to a plurality of devices, such as an input device 1014 (e.g., input device 214) and/or an output device 1016 (e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as a LCD (liquid crystal display) monitor, for displaying information to the user.

According to one aspect of the present disclosure, any one of clients 110 and servers 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving an input selection of a key frame in a video clip;
   including the key frame within a first plurality of frames selected from the video clip;
   adjusting at least one weighting factor for a value entry in the first plurality of frames to obtain a second plurality of frames having at least one reduced dimensionality;
   obtaining a one-dimensional representation of the first plurality of frames with a plurality of weighted entry values from the second plurality of frames;
   correlating at least two entry values in the one-dimensional representation to obtain a selector, wherein the selector is a one-dimensional array with each entry comprising a probability that each of a second plurality of frames be selected as the key frame in a video summary of the video clip;
   storing the at least one weighting factor as a network entry in a process network when the selector picks the key frame from the first plurality of frames; and
   applying the process network to a third plurality of frames in the video clip to form the video summary of the video clip.

2. The computer-implemented method of claim 1, wherein adjusting the at least one weighting factor comprises convolving a plurality of entry values in the first plurality of frames in at least one dimension.

3. The computer-implemented method of claim 1, wherein adjusting the at least one weighting factor comprises sub sampling a plurality of entry values in the first plurality of frames in at least one dimension.

4. The computer-implemented method of claim 1, wherein adjusting the at least one weighting factor comprises training a three-dimensional convolved neural network on the first plurality of frames.

5. The computer-implemented method of claim 1, wherein correlating at least two entry values in the one-dimensional representation comprises adjusting at least another weighting factor to ensure that a value of 'one' is associated with the key frame.

6. The computer-implemented method of claim 1, wherein correlating at least two entry values in the one-dimensional representation comprises adjusting at least another weighting factor to ensure that a value of 'zero' is associated with a frame in the first plurality of frames other than the key frame.

7. The computer-implemented method of claim 1, wherein receiving an input selection of a key frame in a video clip comprises receiving an input selection of a first key frame and a second key frame and selecting the network entry in the process network when the selector picks the first key frame and the second key frame from the first plurality of frames.

8. The computer-implemented method of claim 1, wherein receiving the input selection of the key frame in a video clip comprises receiving a text string describing a feature of the key frame, and storing the text string in an annotated training database.

9. The computer-implemented method of claim 1, further comprising automatically obtaining the key frame when a user uploads the video clip.

10. A system comprising:
    one or more processors; and
    a non-transitory, computer-readable storage medium coupled to the one or more processors, the non-transitory, computer-readable storage medium including instructions that, when executed by the one or more processors, cause the one or more processors to:
    receive a video clip from a user;
    request a user selection of a key frame in the video clip;
    receive, from the user, the key frame in the video clip;
    form a selector with a one-dimensional array with each entry comprising a probability that differentiates each of a plurality of frames adjacent to the key frame from the key frame;
    select, with the selector, a plurality of frames from the video clip based on the key frame selected by the user;
    form a video summary of the video clip based on the plurality of frames; and
    configure the video summary of the video clip to play when the video clip is selected by a search engine and a pointer device hovers over a thumbnail of the video clip.

11. The system of claim 10, wherein to select a plurality of frames from the video clip based on the key frame selected by the user, the instructions cause the processor to select a frame sequence with a frame captured before the key frame and a frame captured after the key frame.

12. The system of claim 10, wherein to form a video summary of the video clip based on the plurality of frames, the instructions cause the processor to apply a process network to a sequence of frames from the video clip.

13. The system of claim 10, wherein to form a video summary of the video clip based on the plurality of frames, the instructions cause the processor to identify a sequence of frames in the video clip as a relevant scene based on a selector in a process network.

14. The system of claim 10, wherein to form a video summary of the video clip based on the plurality of frames, the instructions cause the processor to identify a sequence of frames in the video clip as a relevant scene based on an interaction history with the user.

15. The system of claim 10, wherein to form a video summary of the video clip based on the plurality of frames, the instructions cause the processor to identify a sequence of frames in the video clip as a relevant scene based on an annotated training database including an input from a second user.

16. The system of claim 10, wherein to request a user selection of the key frame in the video clip, the instructions cause the processor to prompt the user to select the key frame from a video clip with a scrolling tool on a display in a client device.

17. The system of claim 10, wherein the instructions cause the processor to form the video summary of the video clip based on the plurality of frames and on a text description of relevant features of the video clip, the text description of relevant features being provided by the user.

18. A computer-implemented method, comprising:
uploading, by a user via an application on a client device, a video clip onto a server;
receiving, by the user in the client device, a request from the server to select a key frame in the video clip; and
providing, to a server, the key frame in the video clip based on a relevant feature to be emphasized in a video summary of the video clip, wherein providing to the server the key frame in the video clip comprises selecting the key frame from the video clip with a scrolling tool provided in a user interface displayed on the client device, and providing a text indicative of a user description of a relevant feature in the key frame so that the server selects multiple frames from the video clip based on a probability to select each of the frames as the key frame.

19. The computer-implemented method of claim 18, wherein providing to the server the key frame in the video clip comprises providing a text description of a relevant feature of the video clip in a user interface displayed on the client device.

20. The computer-implemented method of claim 18, further comprising directing a pointing device over a thumbnail of a second video clip to play a second video summary of the second video clip when the second video clip is listed in a search result of a search engine in the server, wherein the second video clip comprises a second key frame selected by a second user.

* * * * *